(No Model.) 2 Sheets—Sheet 1.

J. B. POOLEY.
DEVICE FOR OPERATING THE SLIDES OR RESTS OF DESKS.

No. 500,610. Patented July 4, 1893.

WITNESSES:
Emile E. Berthoud
Thomas M. Smith.

INVENTOR,
James B. Pooley,
By J. Walter Douglass.
ATT'Y.

(No Model.) 2 Sheets—Sheet 2.

J. B. POOLEY.
DEVICE FOR OPERATING THE SLIDES OR RESTS OF DESKS.

No. 500,610. Patented July 4, 1893.

UNITED STATES PATENT OFFICE.

JAMES B. POOLEY, OF CLEMENTON, NEW JERSEY.

DEVICE FOR OPERATING THE SLIDES OR RESTS OF DESKS.

SPECIFICATION forming part of Letters Patent No. 500,610, dated July 4, 1893.

Application filed August 17, 1892. Serial No. 443,301. (No model.)

*To all whom it may concern:*

Be it known that I, JAMES B. POOLEY, a citizen of the United States, residing at Clementon, in the county of Camden and State of New Jersey, have invented certain new and useful Improvements in Devices for Operating the Slides or Rests of Desks and other Articles of Furniture, of which the following is a specification.

My invention has relation in general to articles of furniture provided with slides or rests; and it relates more particularly to certain improved devices for automatically actuating the slides or rests of articles of furniture.

The principal objects of my invention are first, to provide a simple, comparatively inexpensive, durable and efficient device for actuating the slides or rests of an article of furniture; second, to provide an article of furniture with a movable member and with slides or rests having certain devices connected therewith and with the movable member in order that the slides or rests may be automatically actuated by the operation of the movable member; and third, to provide a desk or similar article of furniture with automatically actuated slides or rests for the lid or fall thereof.

My invention consists of a desk or other article of furniture provided with a movable member and with slides or rests having devices connected therewith and with the movable member and adapted to be actuated by the operation of said member.

My invention further consists of the improvements in desks or other articles of furniture, hereinafter described and claimed.

The nature, scope and general characteristic features of my invention will be more fully understood from the following description taken in connection with the accompanying drawings forming part hereof; and in which—

Figure 1:
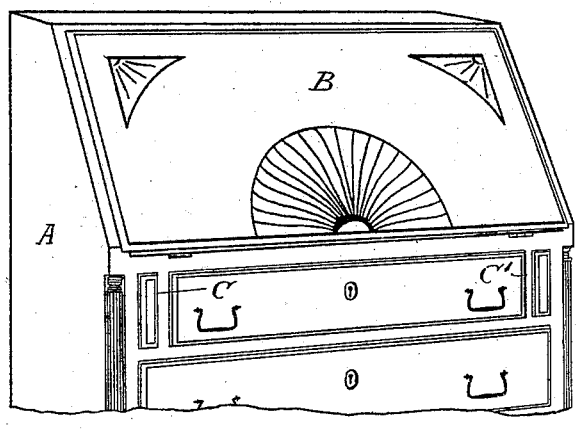
Figure 2:
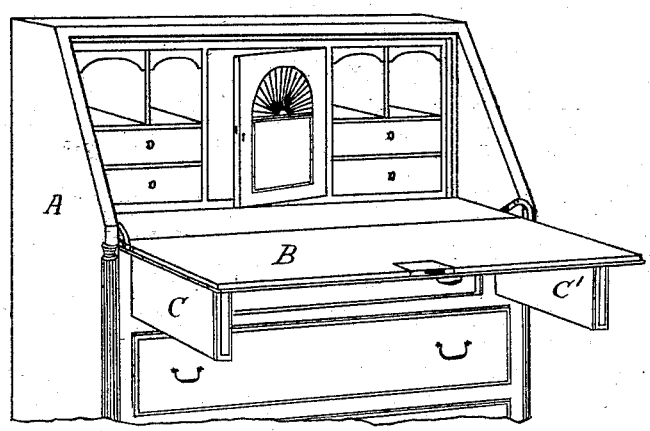
Figure 3:
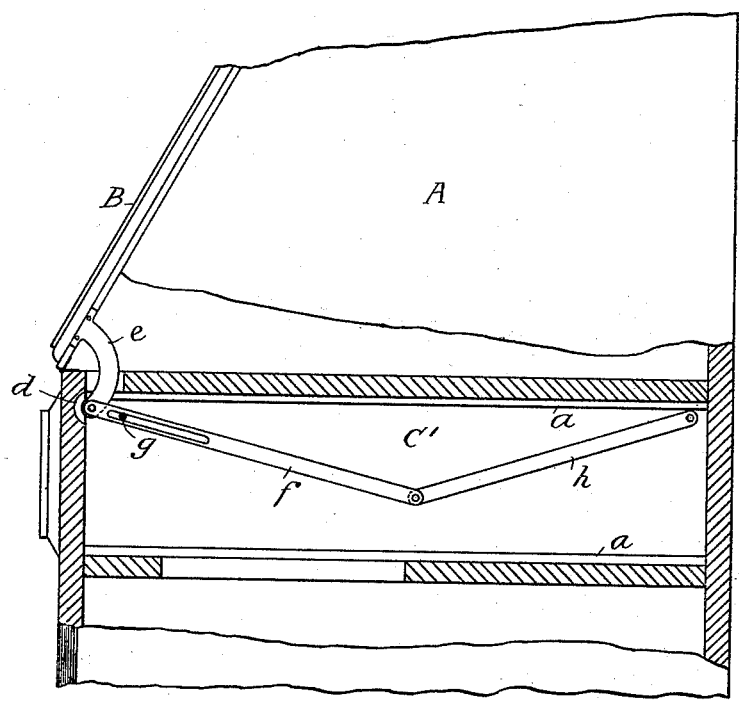
Figure 4:
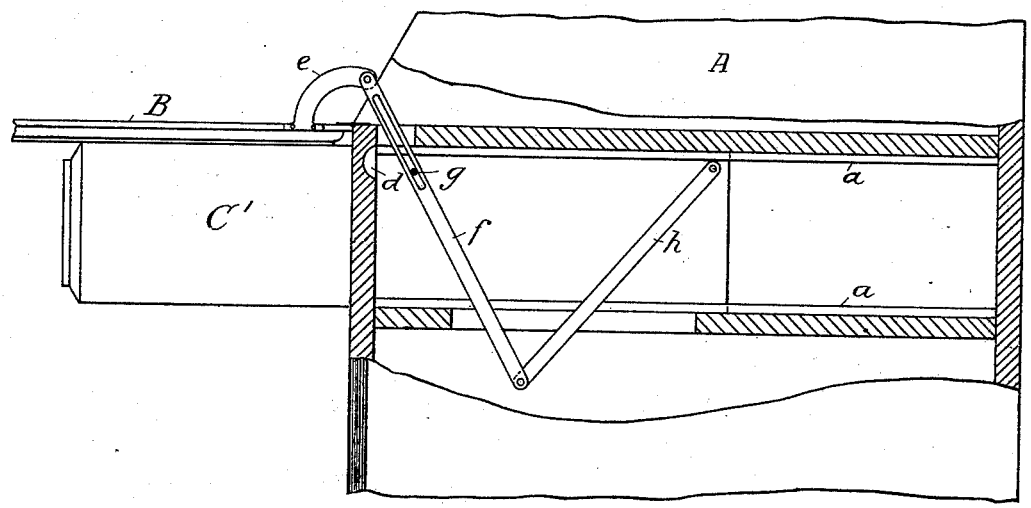

Figure 1, is a perspective view of so much of a desk as exposes to view in closed positions the slides or rests and the lid or fall thereof and with the devices of my invention adapted to operate the slides or rests of the desk by the movement of the lid or fall thereof concealed from view. Fig. 2, is a similar view of a desk showing the slides or rests extended therefrom and with the lid or fall in a lowered position and having the device of my invention applied thereto. Fig. 3, is a view partly in end elevation and partly in section of a desk with the slides or rests and lid or fall in closed positions and with my invention shown in application and also showing the position the same assumes when the parts of the desk are in a closed position; and Fig. 4, is a similar view of a desk with the lid or fall and slides or rests in open positions with my invention illustrated in application thereto and also showing the position the same assumes when the parts of the desk occupy extended positions.

Referring to the drawings, A is a desk or other article of furniture provided with a lid or fall B, suitably hinged thereto, C and C', (Figs. 1 and 2,) are slides or rests afforded a range of back and forth movement in channels or on rails $a$, provided in the body of the article.

$d$, (Figs. 3 and 4,) is a recess provided in each of the front internal corners or angular portions of the article of furniture into which recess fits when the lid is closed one of the extremities of a curved bracket $e$, suitably secured to the edge of the lid or fall B, as illustrated in Figs. 2 and 3. This bracket $e$, is pivotally connected with a rod or arm $f$, partially slotted and afforded a range of reciprocating movement on a stud pin $g$, suitably attached to the internal frame-work of the desk or other article of furniture, preferably in the manner illustrated in Figs. 3 and 4. This rod or arm $f$, is pivotally connected with an arm or rod $h$, which is pivoted to the rear portion of one of the slides or rests C and C', in order that by the raising of the lid or fall B, the slides or rests may be actuated in such manner as to be concealed in the body of the desk or other article of furniture in the manner illustrated in Fig. 3, or by the lowering of the lid or fall B, the slides or rests C and C', with their operating devices may be caused to assume the position illustrated in Fig. 4. It will be observed that the curved bracket $e$, of the slide or rest operating device shown in Fig. 3, assumes such position in contact with the concave surface of the recess $d$, when the lid or fall B, is closed against the standards and top cross pieces of the desk, and also when the lid or fall B, is in a position for use only the bracket e, of the slide or rest operating device is exposed to view. The other parts thereof being concealed within the wall of the end standards of the desk or other article of furniture.

Having thus described the nature and objects of my invention, what I claim as new, and desire to secure by Letters Patent, is—

1. An article of furniture provided with internal openings and recesses, a movable hinged member having brackets secured at one of their ends thereto, slides or rests afforded a range of movement, and arms for each slide or rest pivoted to each and connected at one end with one of the slides or rests and at the other with one of said brackets secured to the movable member, substantially as and for the purposes set forth.

2. An article of furniture provided with a lid or fall, slides or rests afforded a range of movement on rails, curved brackets applied to the lid or fall, pivotal arms connected with the brackets and with the slides or rests and certain of the arms slotted and pivotally connected with the internal body of the article so as to afford the same in the actuation of the lid or fall a range of movement on the pivots of the internal body, substantially as and for the purposes set forth.

3. An article of furniture provided with a lid or fall, slides or rests afforded a range of to and fro movement in channels, curved-brackets applied to the lid or fall and adapted to engage in concave recesses formed in the body of the article and to be released from the same by the movements of the lid or fall and the brackets connected with slotted and pivoted arms in connection with each other and with the slides or rests and afforded in the actuation of the lid or fall a range of sliding and reciprocating movement on the pivots of the internal body of the article, substantially as and for the purposes set forth.

In testimony whereof I have hereunto set my signature in the presence of two subscribing witnesses.

JAMES B. POOLEY.

Witnesses:
THOMAS M. SMITH,
RICHARD C. MAXWELL.